United States Patent
Seok

(10) Patent No.: US 9,319,950 B2
(45) Date of Patent: *Apr. 19, 2016

(54) METHOD AND APPARATUS FOR BAND SWITCHING IN WIRELESS LOCAL ACCESS NETWORK

(71) Applicant: LG Electronics Inc., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

This patent is subject to a terminal disclaimer.

(21) Appl. No.: 14/205,441

(22) Filed: Mar. 12, 2014

(65) Prior Publication Data

US 2014/0192777 A1    Jul. 10, 2014

Related U.S. Application Data

(63) Continuation of application No. 13/139,152, filed as application No. PCT/KR2009/007436 on Dec. 11, 2009, now Pat. No. 8,711,748.

(30) Foreign Application Priority Data

Dec. 12, 2008    (KR) ........................ 10-2008-0126487

(51) Int. Cl.
| | |
|---|---|
| G08C 17/00 | (2006.01) |
| H04Q 7/24 | (2006.01) |
| H04W 36/06 | (2009.01) |
| H04W 52/02 | (2009.01) |
| H04W 88/10 | (2009.01) |

(52) U.S. Cl.
CPC .......... *H04W 36/06* (2013.01); *H04W 52/0229* (2013.01); *H04W 88/10* (2013.01); *Y02B 60/50* (2013.01)

(58) Field of Classification Search
CPC ..................................................... H04W 48/16
USPC ....................... 370/310, 311, 338; 455/552.1
See application file for complete search history.

(56) References Cited

U.S. PATENT DOCUMENTS

| | | | |
|---|---|---|---|
| 8,301,190 B2* | 10/2012 | Chandra | .................... 455/552.1 |
| 2004/0219955 A1 | 11/2004 | daCosta | |

(Continued)

FOREIGN PATENT DOCUMENTS

| | | |
|---|---|---|
| KR | 10-2005-0100951 A | 10/2005 |
| KR | 10-2007-0046647 A | 5/2007 |

(Continued)

*Primary Examiner* — Wanda Z Russell
(74) *Attorney, Agent, or Firm* — Birch, Stewart, Kolasch & Birch, LLP

(57) ABSTRACT

A method and apparatus for switching a band in a wireless local access network (WLAN) is provided. The method includes transmitting a multi-band switch request message to request switching from a first frequency band to a second frequency band, and receiving a multi-band switch response message in response to the multi-band switch request message. The multi-band switch request message includes a multi-band switch schedule to operate in the second frequency band. Wider coverage can be supported by using multi-band.

6 Claims, 4 Drawing Sheets

(56) References Cited

U.S. PATENT DOCUMENTS

| | | |
|---|---|---|
| 2005/0053015 A1 | 3/2005 | Jin et al. |
| 2006/0045034 A1 | 3/2006 | Kwon et al. |
| 2006/0109815 A1 | 5/2006 | Ozer et al. |
| 2007/0104138 A1 | 5/2007 | Rudolf et al. |
| 2007/0253391 A1 | 11/2007 | Shao et al. |
| 2010/0046457 A1* | 2/2010 | Abraham et al. ............ 370/329 |
| 2010/0074190 A1* | 3/2010 | Cordeiro et al. ............ 370/329 |
| 2010/0167750 A1 | 7/2010 | Lee et al. |

FOREIGN PATENT DOCUMENTS

| | | |
|---|---|---|
| WO | WO 2008/088187 A1 | 7/2008 |
| WO | WO 2008/126958 A1 | 10/2008 |

* cited by examiner

Fig. 3
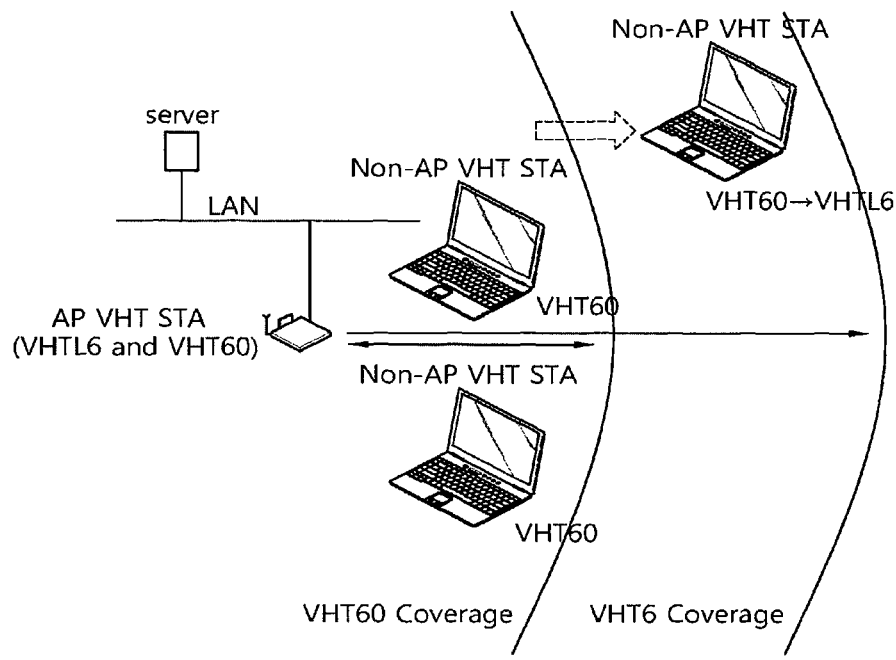
Fig. 4
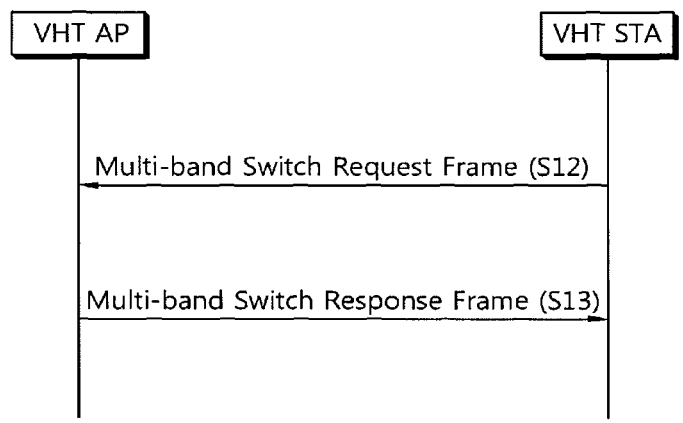
Fig. 5
| Order | Information |
|---|---|
| 1 | Category |
| 2 | Action |
| 3 | Dialog Token |
| 4 | Regulatory Class |
| 5 | Primary Channel Number |
| 6 | Secondary Channel Offset |
| 7 | Extension Channel Offset |
| 8 | Multi-band Switch Schedule |

Fig. 6

| Element ID | Length | Start Time | Interval | Duration |
|---|---|---|---|---|
| Octets: 1 | 1 | 4 | 4 | 4 |

Fig. 7

| Order | Information |
|---|---|
| 1 | Category |
| 2 | Action |
| 3 | Dialog Token |
| 4 | Result Code |

Fig. 8

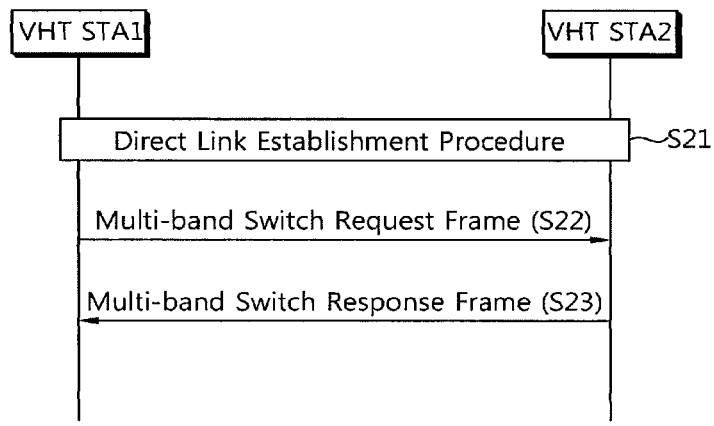

Fig. 9

| Order | Information |
|---|---|
| 1 | Category |
| 2 | Action |
| 3 | Destination MAC Address |
| 4 | Source MAC Address |
| 5 | Capability Information |
| 6 | DLS Timeout Value |
| 7 | Supported Rates |
| 8 | Extended Supported Rates |
| 9 | HT Capability Information |
| 10 | VHT Capability Information |
| 11 | Secondary Channel Offset |
| 12 | Extension Channel Offset |

Fig. 10

| Order | Information |
|---|---|
| 1 | Category |
| 2 | Action |
| 3 | Status Code |
| 4 | Destination MAC Address |
| 5 | Source MAC Address |
| 6 | Capability Information |
| 7 | DLS Timeout Value |
| 8 | Supported Rates |
| 9 | Extended Supported Rates |
| 10 | HT Capability Information |
| 11 | VHT Capability Information |
| 12 | Secondary Channel Offset |
| 13 | Extension Channel Offset |

METHOD AND APPARATUS FOR BAND SWITCHING IN WIRELESS LOCAL ACCESS NETWORK

CROSS REFERENCE TO RELATED APPLICATIONS

This application is a Continuation of U.S. application Ser. No. 13/139,152 filed on Jun. 10, 2011, which is a National Phase application of PCT International Application No. PCT/KR2009/007436 filed on Dec. 11, 2009, and claims priority under 35 U.S.C. §119(a) to Patent Application No. 10-2008-0126487 filed in Korea on Dec. 12, 2008, all of which are hereby expressly incorporated by reference into the present application.

BACKGROUND OF THE INVENTION

1. Field of the Invention

The present invention relates to a wireless local access network (WLAN), and more particularly, to a procedure in which a station switches a frequency band currently used to another frequency band in a WLAN system.

2. Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data transfer rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data transfer rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data transfer rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data transfer rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of 1 Gbps or higher. This is because the IEEE 802.11n MAC/PHY protocol is designed for an operation of a single station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of 1 Gbps or higher in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of 1 Gbps or higher in a MAC service access point (SAP). The VHT system is named arbitrarily. To provide a throughput of 1 Gbps or higher, a feasibility test is currently being conducted for the VHT system using 4?4 MIMO and a channel bandwidth of 80 MHz.

A method using a band of 6 GHz or lower and a method using a band of 60 GHz are currently discussed as a method for achieving a throughput of 1 Gbps or higher in a very high throughput (VHT) wireless local access network (WLAN) system. Herein, the throughput of 1 Gbps or higher is used as a criterion, and is a value measured by a medium access control (MAC) service access point (SAP). An access point (AP) supporting a VHT and a non-AP station (STA) may have a MAC/physical layer (PHY) protocol operating in a band of 6 GHz or lower and/or in a band of 60 GHz. An STA that can operate in both the band of 6 GHz or lower and the band of 60 GHz, that is, an STA that supports a VHT protocol in both the band of 6 GHz or lower and the band of 60 GHz is referred to as a multi-band VHT STA.

The band of 6 GHz or lower shows a relatively wide service coverage but disadvantageously has a small available channel bandwidth. On the other hand, the band of 60 GHz advantageously has a great available channel bandwidth, but disadvantageously has a narrower service coverage than the channel using the band of 6 GHz or lower according to a channel property. The two bands may be both used in a method of effectively using the advantages and disadvantages of the two bands. That is, in this method, a multi-band VHT STA is used.

For example, when communication is performed between multi-band VHT STAs located close to each other, a channel using the band of 60 GHz is used, whereas when communication is performed between multi-band VHT STAs located relatively far from each other, a channel using the band of 6 GHz or lower is used. In this manner, when located close to each other, a high throughput can be achieved by using a relatively wide channel bandwidth in the channel using the band of 60 GHz, whereas when located far from each other, reliable communication can be achieved by using the channel using the band of 6 GHz or lower even if a throughput is slightly decreased. In the latter case, instead of the VHT protocol, communication can be performed by utilizing the conventional WLAN protocol, e.g., institute of electrical and electronics engineers (IEEE) 802.11a/b/g/n or the like.

In order for the multi-band VHT STA to communicate in both the band of 60 GHz and the band of 6 GHz or lower in this manner, there is a need to define a band switching procedure. However, such a band switching procedure is not defined in the currently available WLAN technology.

SUMMARY OF THE INVENTION

The present invention provides a procedure capable of switching a band currently used to another band while communication is performed between multi-band VHT STAs.

The present invention also provides a new frame format that can be used in a band switching procedure for a multi-band VHT STA.

The present invention also provides a procedure capable of switching a band currently used for communication with an AP or another STA in a state where an STA maintains association and authentication with respect to the AP.

In an aspect, a method of switching a band in a wireless local access network (WLAN) is provided. The method includes transmitting a multi-band switch request message to request switching from a first frequency band to a second frequency band, and receiving a multi-band switch response message in response to the multi-band switch request message, wherein the multi-band switch request message includes a multi-band switch schedule to operate in the second frequency band.

The multi-band switch schedule may include an operation schedule of the second frequency band.

The first frequency band may be a band of 60 GHz and the second frequency band may be a band of 6 GHz or below.

The first frequency band may be a band of 6 GHz or below and the second frequency band may be a band of 60 GHz.

The multi-band switch request message may further include information about a primary channel to be used in the second frequency band.

The multi-band switch request message may further includes information about a secondary channel to be used in the second frequency band.

The multi-band switch request message may be transmitted by a first non-AP station, and the multi-band switch response message is received from a second non-AP station.

In another aspect, a wireless apparatus includes a transceiver, and a processor operatively coupled with the transceiver and configured to transmit a multi-band switch request message to request switching from a first frequency band to a second frequency band, and receive a multi-band switch response message in response to the multi-band switch request message, wherein the multi-band switch request message includes a multi-band switch schedule to operate in the second frequency band.

A multi-band station (STA) in a very high throughput (VHT) wireless local area network (WLAN) system can continuously communicate with a multi-band access point (AP) or another multi-band STA by switching to a channel with a band that differs from a band currently used. Two multi-band STAs communicating with each other or the multi-band STA and the multi-band AP can perform communication with a high data processing rate by using a relatively wide bandwidth in a band of 60 GHz when located close to each other, and can reliably communicate with each other in a band of 6 GHz when located far from each other. Therefore, wider coverage can be supported by using multi-band.

BRIEF DESCRIPTION OF THE DRAWINGS

FIG. 3 is a diagram showing an exemplary structure of a VHT basic service set (BSS) including a multi-band VHT STA and a multi-band VHT access point (AP).

FIG. 4 is a message flow diagram showing an example of a band switching procedure in a VHT infrastructure BSS of a VHT WLAN system according to an embodiment of the present invention.

FIG. 5 is a diagram showing an exemplary format of a multi-band switch request frame.

FIG. 6 is a diagram showing an exemplary format of a multi-band switch schedule information element.

FIG. 7 is a diagram showing an exemplary format of a multi-band switch response frame.

FIG. 8 is a message flow diagram showing an example of a band switching procedure in a VHT WLAN system according to another embodiment of the present invention.

FIG. 9 is a diagram showing an exemplary format of a direct link setup (DLS) request action frame according to an embodiment of the present invention.

FIG. 10 is a diagram showing an exemplary format of a DLS response action frame according to an embodiment of the present invention.

DETAILED DESCRIPTION OF THE INVENTION

Figure 1:
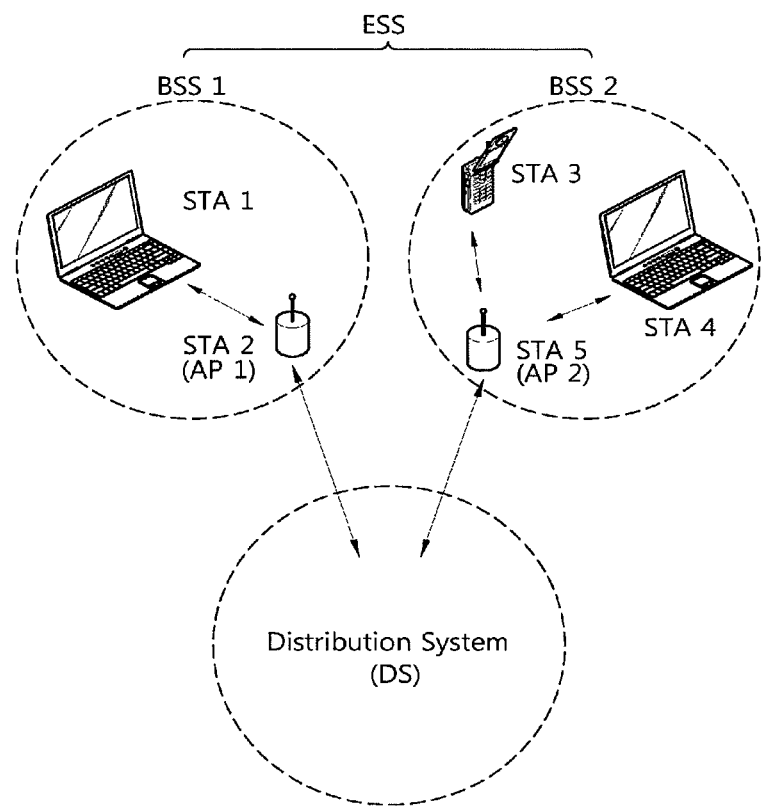
FIG. 1 is a schematic view showing an exemplary structure of a very high throughput (VHT) wireless local area network (WLAN) system according to an embodiment of the present invention.

FIG. 1 is a schematic view showing an exemplary structure of a very high throughput (VHT) wireless local access network (WLAN) system according to an embodiment of the present invention.

Referring to FIG. 1, a WLAN system such as the VHT WLAN system includes one or more basis service sets (BSSs). The BSS is a set of stations (STAs) which are successfully synchronized to communicate with one another, and is not a concept indicating a specific region. As in the WLAN system to which the embodiment of the present invention is applicable, a BSS that supports a super high-rate data processing of 1 GHz or higher in a medium access control (MAC) service access point (SAP) is referred to as a VHT BSS.

The VHT BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the VHT STA, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an wireless apparatus including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports the super high-rate data processing of 1 GHz or higher in the multi-channel environment to be described below. In addition, the STA according to the embodiment of the present invention is a multi-band VHT STA (hereinafter, simply referred to as a 'VHT STA') supporting communication in both a band of 60 GHz and a band of 6 GHz or lower.

Figure 2:
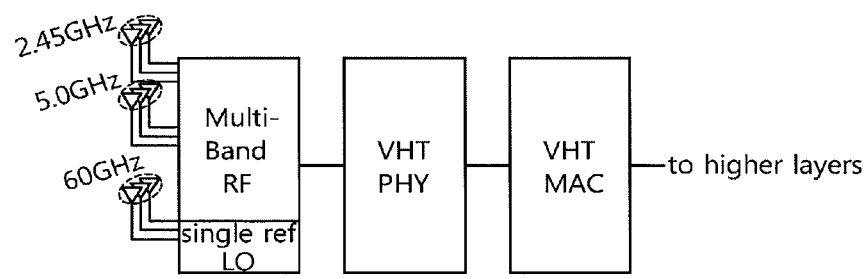
FIG. 2 is a block diagram showing a system architecture of a multi-band VHT station (STA).

FIG. 2 is a block diagram showing a system architecture of the multi-band VHT STA. The system architecture may equally apply to a system architecture of a multi-band VHT AP system to be described below. Referring to FIG. 2, the multi-band VHT STA includes a multi-band RF, a VHT PHY, a VHT MAC, and the like to support all bands of 2.45 GHz, 5.0 GHz, and 60 GHz.

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-rate data processing of 1 GHz or higher in the multi-channel environment to be described below.

A non-AP STA may support a power save mode. There are two operation modes to save power: an active mode and a power save mode. In the active mode, the non-AP STA keep running in a wakeup state. In the power save mode, the non-AP STA switched periodically/non-periodically between a wakeup state and a doze state. In the wakeup state, the non-AP STA can be ready to transmit and receive data frames. In the doze state, the non-AP STA cannot transmit and receive data frames or can receive minimum amount of information used to monitor channels.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-rate data processing of 1 GHz or higher in the multi-channel environment to be described below. In addition, the AP according to the embodiment of the present invention is referred to as a multi-band VHT AP (hereinafter, simply referred to as a 'VHT AP') supporting communication in both the band of 60 GHz and the band of 6 GHz or lower.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

FIG. 3 is a diagram showing an exemplary structure of a VHT BSS including a multi-band VHT STA and a multi-band VHT AP. Referring to FIG. 3, the VHT BSS may include one or more VHT APs and one or more VHT STAs. The multi-band VHT AP may have a multi-radio interface to simultaneously support a channel using a band of 6 GHz or lower and a channel using a band of 60 GHz (which can be expressed by "VHTL6 and VHT60"). The multi-band VHT STA may have a dual-band interface for each of the channel using the band of 6 GHz or lower and the channel using the band of 60 GHz. However, since the multi-band VHT STA has only a single-radio interface, the channel using the band of 6 GHz or lower and the channel using the band of 60 GHz cannot be supported simultaneously (which can be expressed by "VHTL6 or VHT60").

Meanwhile, as shown in FIG. 3, the VHT AP has a relatively narrow service coverage in the band of 60 GHz (i.e., VHT60 coverage) and has a relatively wide service coverage in the band of 6 GHz or lower (i.e., VHTL6 coverage). In this case, if the VHT STA is located inside the VHT60 coverage, the channel using the band of 60 GHz can be used together with the VHT AP, thereby achieving a relatively high throughput. On the other hand, if the VHT STA located inside the VHT60 coverage moves to the VHT6 coverage, the channel using the band of 60 GHz cannot be used for communication with the VHT AP, and thus the channel needs to be switched to the channel using the band of 6 GHz or lower. Such band switching may occur not only when communication is performed between the VHT AP and the VHT STA in the infrastructure VHT BSS but also when communication is performed between two VHT STAs setting up a direct link or between VHT STAs in an independent BSS (IBSS).

The band switching is performed to change the frequency band such as the frequency band of 6 GHz or lower and the frequency band of 60 GHz. For this, an STA switching a band must have a dual-band or multi-band interface. When performing the band switching, channel switching is also performed. The channel switching performed in this case is different from channel switching which changes only a channel used in the same frequency band.

As a method of switching a channel in a BSS including a STA having a single-band interface, there is a known method in which a AP transmits a channel switch announcement frame or an extended channel switch announcement frame to the STA. Alternatively, the AP may announce a channel frequency of the BSS to the STA by using a different-type frame including a channel switch announcement information element or an extended channel switch announcement information element.

The channel switch announcement information element (IE) or the channel switch announcement frame is used to switch a channel frequency of a primary channel and/or a secondary channel. Further, the extended channel switch announcement IE or the extended channel switch announcement frame is used to switch a regulatory class together with a channel frequency of the primary channel, the secondary channel, and/or an extension channel. As described above, such frames or IEs are for changing the regulatory class or a channel of a frequency used in the same band, and thus cannot be directly used for band switching.

For example, as to a VHT STA associated with a specific VHT AP, if the VHT STA is first located close to the VHT AP and is then departing far from the VHT AP or if the VHT STA is first located far from the VHT AP and is then approaching close to the VHT AP, it is effective to perform band switching from the band of 60 GHz to the band of 6 GHz or lower or from the band of 6 GHz or lower to the band of 60 GHz. Alternatively, if a distance between two VHT STAs changes or if a distance between two VHT STAs changes in the IBSS, it may also be effective to perform band switching.

A method of utilizing an existing frame such as an association request frame, a reassociation request frame, and/or a deassociation request frame or the like may be considered as one method of performing band switching. However, since the use of the frame implies that an existing association state or connection is released and a new association or connection is established, not only connectivity is not maintained but also an association procedure, an authorization procedure, and the like have to be performed again. Thus, there is a disadvantage in that a switching time is relatively great.

A band switching procedure according to an embodiment of the present invention proposes to use a multi-band switch request frame and a multi-band switch response frame. The multi-band switch request frame may be transmitted by an STA intending to perform band switching between two VHT non-AP STAs or between a VHT non-AP STA and a VHT AP, and the other VHT STA or VHT AP transmits the multi-band switch response frame in response to the multi-band switch request frame.

FIG. 4 is a message flow diagram showing an example of a band switching procedure in a VHT infrastructure BSS of a VHT WLAN system according to an embodiment of the present invention. Terms used in the following description, such as a frame, an IE, a sub-field, and the like, are for exemplary purposes only, and thus may change without particular restriction as long as there is no change in functions of the frame, the IE, and the like.

Referring to FIG. 4, a VHT non-AP STA intending to switch a frequency band currently used to another frequency band transmits a multi-band switch request frame to a VHT AP (step S 12). Although it is shown in FIG. 4 that the VHT non-AP STA transmits the multi-band switch request frame to the VHT AP, this is for exemplary purposes only, and thus the VHT AP may transmit the multi-band switch request frame to the VHT non-AP STA.

The multi-band switch request frame includes a field or information specifying a primary channel to be used in the switched frequency band. When a bandwidth of 40 MHz or higher is used or supported in the switched band width, the multi-band switch request frame may include a field or information specifying a secondary channel and/or an extension channel.

The multi-band switch request frame may include information specifying a band switching time and/or an operation time in the switched band. The information regarding the band switching time and the operation time can be useful when band switching is periodically performed. For example, when it is intended to operate in the band of 6 GHz or lower while operating in the band of 60 GHz, the multi-band switch request frame may be used to announce a time of switching to the band of 6 GHz or lower and an operation time in the band of 6 GHz or lower to a peer STA.

Periodic band switching implies that the VHT AP and the VHT STA operate in the band of 60 GHz in a specific time, and periodically operate in the band of 6 GHz or lower in another specific time. In this manner, it is possible to decrease an overhead that may be caused in a process of exchanging the multi-band switch request frame and the multi-band switch response frame whenever band switching is performed by the VHT AP and the VHT STA communicating with each other.

FIG. 5 is a diagram showing an exemplary format of a multi-band switch request frame. Referring to FIG. 5, a multi-band switch request frame includes a regulatory class and a primary channel number in addition to typical information (e.g., a category, an action value, a dialog token, etc.) included in a frame of an IEEE 802.11 WLAN. The multi-band switch request frame may further include a secondary offset, a extension channel offset, and/or a multi-band switch scheduling.

The regulatory class is for specifying a regulatory class in a band to be switched. The primary channel number is for specifying a primary channel number in the band to be switched. The secondary channel offset is for specifying a secondary channel number in the band to be switched, and can specify a secondary channel by using a relative position with respect to a primary channel, such as secondary channel number (SCN), secondary channel above (SCA), or secondary channel below (SCB). The extension channel offset is for specifying an extension channel number in the band to be switched. According to the embodiment of the present invention, there is no restriction on a method of specifying an extension channel.

The multi-band switch schedule may include a multi-band switching time and/or an operation schedule at the primary channel and/or the secondary channel. The multi-band switch schedule is a schedule for switching frequency bands. The operation schedule is a schedule of how to operate in the switched band. The operation schedule may be a schedule of operation in a power save mode at the primary channel and/or the secondary channel. By the multi-band switch schedule, the STA can exchange the schedule of the band switching along with multi-band. Therefore, no additional frame for transmitting the multi-band switch schedule is not necessary and signaling overhead can be reduced.

FIG. 6 is a diagram showing an exemplary format of the multi-band switch schedule. Referring to FIG. 6, the multi-band switch schedule includes an element identifier (ID) field, a length field, a start time field, an interval field, and a duration field. By using the multi-band switch schedule information element having this format, periodic band switching can be performed by combining values which are set in the start time field, the interval field, and the duration field.

Referring back to FIG. 4, upon receiving the multi-band switch request frame, the VHT AP transmits the multi-band switch response frame to the VHT STA in response to the received request frame (step S13). The multi-band switch response frame includes information indicating permission or denial of the band switch request, and may optionally include information indicating a reason of permission or denial. FIG. 7 is a diagram showing an exemplary format of the multi-band switch response frame. Referring to FIG. 7, the multi-band switch response frame includes a result code in addition to typical information (e.g., a category, an action value, a dialog token, etc.) included in the frame of the IEEE 802.11 WLAN. The result code may be set to a value indicating permission or denial of the band switching request, and optionally may be set to a value indicating a reason of permission or denial.

By using the band switching procedure according to the embodiment of the present invention, the VHT AP and the VHT STA communicating with each other can optionally change a frequency band. For example, when the VHT STA performing communication by being associated in the band of 60 GHz is outside the service coverage of the VHT AP in the band of 60 GHz, the VHT STA has to operate in the band of 6 GHz or lower. For this, the band switching procedure according to the embodiment of the present invention can be used. In addition, when the VHT STA communicating with the VHT AP in the band of 6 GHz from a far distance moves close to the VHT AP, the band can be switched to the band of 60 GHz to perform communication by using the band switching procedure according to the embodiment of the present invention. In the latter case, the VHT STA does not always have to change the band.

FIG. 8 is a message flow diagram showing an example of a band switching procedure in a VHT WLAN system according to another embodiment of the present invention. Referring to FIG. 8, a direct link setup procedure may be performed between a first VHT STA (i.e., VHT STA 1) and a second VHT STA (i.e., VHT STA 2) (step S21). A detailed procedure of setting up a direct link may differ according to whether the VHT WLAN system is a system supporting IEEE 802.11e or a system supporting IEEE 802.11z. Only the system supporting IEEE 802.11e will be described in the following description. However, it is apparent to those skilled in the art that the embodiment of the present invention can also apply to a tunneled direct link conforming to IEEE 802.11z.

In order to setting up the direct link according to the IEEE 802.11e standard, any one of VHT STAs between the VHT STA 1 and the VHT STA 2, for example, the VHT STA 1 transmits a direct link setup (DLS) request action frame from a peer STA (i.e., the VHT STA 2), and the VHT STA 2 transmits a DLS response action frame to the VHT STA 1 in response to the received DLS request action frame. An exchange procedure of the DLS request/response action frame is the same as the conventional procedure. However, according to the embodiment of the present invention, the VHT STA transmitting the DLS request action frame and the DLS response action frame inserts its capability information related to the VHT WLAN to the frames. For example, the DLS request/response action frame includes a VHT capability information element. In addition, the VHT capability information element may include a multi-band VHT field for indicating support or non-support of a multi-band. Therefore, in step S21, the VHT STA 1 and the VHT STA 2 exchange the DLS request action frame and the DLS response action fame in which a multi-band VHT field is set to '1'.

FIG. 9 is a diagram showing an exemplary format of a DLS request action frame according to an embodiment of the present invention. Referring to FIG. 9, the DLS request action frame includes HT capability information in addition to typical information (e.g., a category, an action, a destination MAC address, a source MAC address, capability information, a DLS timeout value, a supported rate, an extended supported rate, etc.) included in a DLS request action frame introduced in an IEEE P802.11-REVma/D9.0 standard that is a basic standard document for the IEEE 802.11 WLAN. The DLS request action frame according to the embodiment of the present invention includes VHT capability information for indicating its capability related to the VHT WLAN, and may include a secondary channel offset for specifying a secondary channel and an extension channel offset for specifying an extension channel. According to an embodiment, the secondary offset and the extension channel offset may be included in a message exchanged in a channel negotiation process after setting up a direct link.

FIG. 10 is a diagram showing an exemplary format of a DLS response action frame according to an embodiment of the present invention. Referring to FIG. 10, the DLS response action frame includes HT capability information in addition to typical information (e.g., a category, an action, a status code, a destination MAC address, a source MAC address, capability information, a DLS timeout value, a supported rate, an extended supported rate, etc.) included in a DLS response action frame introduced in the IEEE P802.11-REVma/D9.0 standard that is a basic standard document for the IEEE 802.11 WLAN. The DLS response action frame according to the embodiment of the present invention includes VHT capability information for indicating its capability related to the VHT WLAN, and may include a secondary channel offset for specifying a secondary channel and an extension channel offset for specifying an extension channel. According to an embodiment, the secondary channel offset and the extension channel offset may be included in a message exchanged in a channel negotiation process after setting up a direct link.

Referring back to FIG. 8, when the VHT STA 1 setting up a direct link with the VHT STA 2 intends to switch a frequency band currently used to another frequency band (e.g., when a distance to the VHT STA 2 is increased or decrease), the VHT STA 1 transmits a multi-band switch request frame to the VHT STA 2 (step S22). Although it is shown in FIG. 8 that the VHT STA 1 transmits the multi-band switch request frame to the VHT STA 2, this is for exemplary purposes only, and thus the VHT STA 2 may transmit the multi-band switch request frame to the VHT STA 1.

Upon receiving the multi-band switch request frame, the VHT STA 2 transmits a multi-band switch response frame to the VHT STA 1 in response to the received request frame (step S23). The multi-band switch response frame includes information indicating permission or denial of the band switch request, and optionally may include information indicating a reason of permission or denial. In addition, the multi-band switch response frame may include information for negotiating a channel to be used in a direct link with the VHT STA 1 after performing band switching.

A format of the multi-band switch request frame and the multi-band switch response frame has been described in detail in the aforementioned embodiment, and thus further descriptions thereof will be omitted. The following description will focus on only a difference from the aforementioned embodiment based on communication using a direct link.

In the present embodiment, a channel list to be used in transmission through the direct link may be included in a DLS request action frame, a DLS response action frame, and/or a DLS band switch request frame. The frame may include information on a primary channel, a secondary channel, and/or an extension channel. In a case where the VHT AP does not set up the channel list for the primary channel, the secondary channel, and/or the extension channel, the VHT STAs 1 and 2 setting up the direct link can directly negotiate for corresponding information.

For example, if the VHT AP supports only the band of 6 GHz or lower, when the VHT STAs 1 and 2 setting up the direct link intend to transmit data through the direct link in the band of 60 GHz, a channel to be used in the direct link needs to be set up between the VHT STA 1 and the VHT STA 2. For the channel setup, the DLS request action frame, the DLS response action frame, and/or the multi-band switch request action frame may include a channel list or information on the primary channel, the secondary channel, and/or the extension channel.

If the AP does not support the VHT, that is, if the AP is a non-VHT AP, a secondary channel and extension channel list is not set up. Therefore, in order for a BSS managed by the non-VHT AP to utilize a channel bandwidth of 40 MHz, 0 MHz, 0 MHz, or the like, exchange of information on the secondary channel and/or the extension channel is required necessarily between peer VHT STAs. To exchange such information, the DLS request action frame, the DLS response action frame, and/or the multi-band switch request action frame may include the channel list or information on the primary channel, the secondary channel, and/or the extension channel.

What is claimed is:

1. A method for a wireless local access network, the method performed by a first station operating in a power save mode, the method comprising:
    transmitting, to a second station, a multi-band switch request message for requesting a switching from a first frequency band to a second frequency band, the second frequency band including a plurality of channels, wherein the multi-hand switch request message includes switching channel information indicating the second frequency band and a wakeup schedule for periodically operating in the power save mode in the second frequency band;
    receiving, from the second station, a multi-band switch response message in response to the multi-band switch request message, the multi-band switch response message comprising a status code indicating a success or a failure cause of the switching from the first frequency band to the second frequency band; and
    if the status code indicates the success, switching from the first frequency band to the second frequency band,
    wherein the wakeup schedule includes a start time field and a duration field, the start time field indicates a start time of an operation in the power save mode and a duration field indicates a duration of the operation in the power save mode, and
    wherein the switching channel information includes channel number information specifying at least one channel of the plurality of channels to be operated in the second frequency band.

2. The method of claim 1, wherein the first frequency band is a band of 60 GHz and the second frequency band is a band below 6 GHz.

3. The method of claim 1, wherein the wakeup schedule includes a start time field and an interval field, the start time field indicates an offset to start a wakeup state, and the interval field indicates a length of the wakeup state.

4. A device for a wireless local access network, the device comprising:
    a processor; and
    a memory operatively coupled with the processor and configured to store instructions that, when executed by the processor, cause to the device to:
        transmit, to a second station, a multi-band switch request message for requesting a switching from a first frequency band to a second frequency band, the second frequency band including a plurality of channels, wherein the multi-band switch request message includes switching channel information indicating the second frequency band and a wakeup schedule for periodically operating m the power save mode in the second frequency band,
        receive, from the second station, a multi-band switch response message in response to the multi-band switch request message, the multi-band switch response message comprising a status code indicating a success or a failure cause of the switching from the first frequency band to the second frequency band, and
        if the status code indicates the success, switch from the first frequency band to the second frequency band,
    wherein the wakeup schedule includes a start time field and a duration field, the start time field indicates a start time of an operation in a power save mode and a duration field indicates a duration of the operation in the power save mode, and
    wherein the switching channel information includes channel number information specifying at least one channel of the plurality of channels to be operated in the second frequency band.

5. The device of claim 4, wherein the first frequency band is a band of 60 GHz and the second frequency band is a band below 6 GHz.

6. The method of claim 3, wherein the start time field indicates an offset of a next wakeup beacon interval and the interval field indicates a time between two successive wakeup beacon intervals.

* * * * *